Aug. 24, 1948.  M. S. HANCOCK  2,447,647
MOTOR WINDING
Filed Aug. 18, 1945
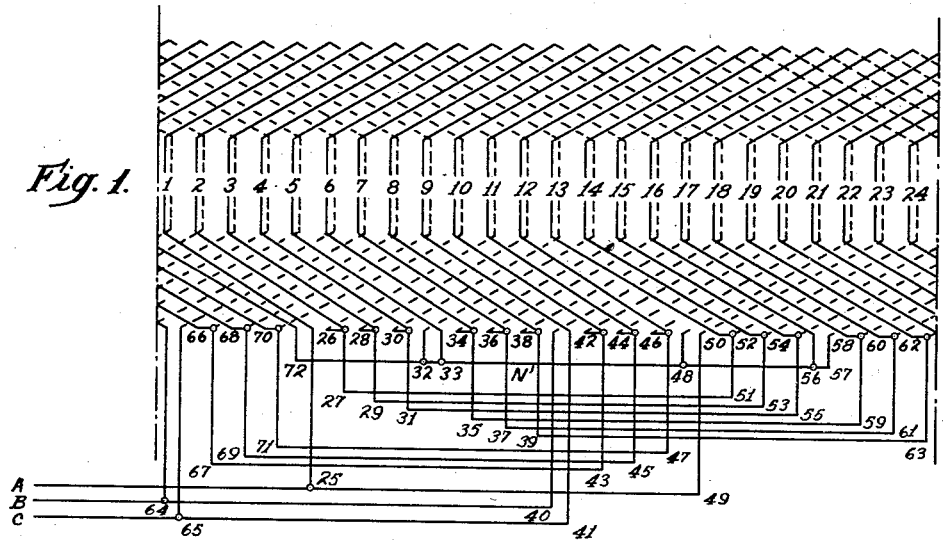
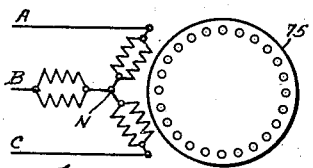
WITNESSES:
Edward Michaels
James F. Young
INVENTOR
Myron S. Hancock.
BY
O. B. Buchanan
ATTORNEY Patented Aug. 24, 1948

2,447,647

UNITED STATES PATENT OFFICE 2,447,647

MOTOR WINDING

Myron S. Hancock, Wilkinsburg, Pa., assignor to Westinghouse Electric Corporation, East Pittsburgh, Pa., a corporation of Pennsylvania Application August 18, 1945, Serial No. 611,407

4 Claims. (Cl. 171—206)

My invention relates to polyphase dynamo-electric machines, and it has particular relation to a new kind of winding for the primary members of two-pole induction-motors.

For as long as can be remembered, there has always been trouble on account of pulsating noise and vibration of two-pole polyphase induction-motors, particularly squirrel-cage motors. These motors have always been noisier than they should be, but occasionally, apparently due to accidents of manufacture, one motor of this sort will develop, during its use, more noise than others which are turned out from the same production-line. It is believed that the cause of this trouble is unbalance of flux in diametrically opposite points of the stator, this unbalance presumably resulting primarily from slight eccentricity of the rotor, due to bearing-wear, unbalance, or slight discrepancies in the reluctance of the magnetic path, at different points around the circumference. It is believed that this unbalanced flux results in unbalanced pull, and hence vibration and noise.

It has been common, heretofore, in two-pole motors, as well as in multipolar motors, to parallel the beginnings and endings of corresponding phase-groups of coils under different poles, particularly the diametrically opposite poles, and this expedient has apparently sufficed, for multipolar motors. In the case of two-pole motors, the paralleling of these diametrically opposite pole-groups has not been sufficient, because there are not enough parallel-connected, diametrically opposite points.

The corresponding intermediate points, which are diametrically opposite to each other within the several phase-groups, have not been of such potentials that they could be connected by equalizers. The reason for this is, that while the total voltages, measured from the beginning to the end of the diametrically opposite phase-groups, are the same, these total voltages are made up of a plurality of vectorially added individual coil-voltages which are phase-related to each other like the successive sides of an inscribed polygon, so that the total voltages correspond to a certain chord of the circumscribed circle, while the intermediate coil-voltages follow along the general shape of an arc of the circle. The trouble has been, however, that the arcs bow out in opposite directions, so that the corresponding, or diametrically opposite, intermediate points could not be connected together by equalizers, because of the voltage-difference which appears between them.

In the past, some special systems of winding-connections have approached, but not completely attained, the desired condition of equal electrical potentials at diametrically opposite points, but these special windings have not been very satisfactory and have had little or no use.

It is the object of my present invention to provide a simple novel winding-arrangement which will make all diametrically opposite points of the primary winding of a two-pole polyphase induction-motor have exactly equal potentials, which can be connected together by equalizer-connections, even at intermediate points in the paralleled phase-groups under the two poles.

A more specific object of my invention is to provide a two-pole polyphase armature-member having the windings of one pole wound, in effect, electrically progressively and the windings of the other pole wound electrically retrogressively. In one form of embodiment of my invention, the progressive and retrogressive winding-portions have their coil-ends all at the same end of the machine, or on the same side of the armature-member. In another form of embodiment of my invention, the same result is obtained by having the open ends of the coils of the windings of one pole disposed at one end of the machine, and having the open ends of the windings of the other pole disposed at the other end of the machine.

With the foregoing and other objects in view, my invention consists in the machines, windings, systems, combinations, parts and methods, hereinafter described and claimed, and illustrated in the accompanying drawing, wherein:

Figure 1 is a developed wiring-diagram of the complete primary winding of a motor embodying my invention in a preferred form of embodiment, Fig. 2 is a similar view of an alternative manner of laying out what electrically amounts to the same winding-effect as Fig. 1, with a different shop-method of placing the individual coils into the armature-member, Figs. 3a and 3b are vector diagrams illustrating the voltages of the individual coils which make up the winding, and Fig. 4 is a diagrammatic view of the primary and secondary members of a three-phase induction-motor utilizing my novel winding-arrangement.

In Figure 1, I have chosen, for illustration, a two-pole three-phase primary or armature-member having twenty-four slots, which are consecutively numbered 1 to 24. The first twelve slots are considered as belonging to the first pole of the motor, and the other twelve slots to the other pole of the motor. The first half of the winding, which is composed of coils having their top coil-sides lying in the tops of the first twelve slots, as indicated by full lines, is a conventional progressively wound winding, which may be called the windings of one pole; while the other half of the winding, having its top coil-sides lying in the tops of the twelve remaining slots of the armature-member or stator-member, is a conventional retrogressively progressing winding, which may be called the windings of the other pole. The corresponding phase-groups of these two winding-halves are paralleled together, with the beginning of the progressively wound group joined to the beginning of the retrogressively wound group, and with the two ends connected together.

Successive numerals, 25 to 48, are applied to the beginnings and endings of coils having their top coil-sides lying in the successive slots 1 to 12, corresponding to one pole of the motor; and successive numerals, 49 to 72, are applied to the endings and beginnings, respectively, of coils having their top coil-sides lying in the tops of the successive slots 13 to 24, corresponding to the other pole of the machine. Thus, the first coil in the first half of the winding extends from the coil-terminal 25 to the coil-side lying in the top of slot 1, and thence to the coil-side lying in the bottom of slot 11, and thence to the coil-terminal 26, which is serially connected, at 26—27, to the beginning of the coil which has its top coil-side in the top of slot 2.

In the second half of the winding, the coil which has its top coil-side in the top of slot 13 and its bottom coil-side in the bottom of slot 23, has the terminals marked 50 and 49, respectively. Actually, this coil is the first coil of a retrogressively progressing winding which includes coils having their top coil-sides lying in slots 13 to 24, but because these coils lie under a south pole, at the same moment when the coils of the first half of the winding lie under a north pole, the winding-connections begin with the ends of the coil, so that the first coil of the second half of the armature-winding may be regarded as starting with the coil-terminal 49, and then successively including the coil-side lying in the bottom of slot 23, the coil-side lying in the top of slot 13, and the coil-terminal 50, which is serially connected, at 50—51, to the beginning of the next coil around the armature, which includes a coil-side lying in the bottom of slot 24 and a coil-side lying in the top of slot 14.

Designating the three-phase motor-terminals as Lines A, B and C, and assuming a star-connected primary or armature-winding, there will be six phase-groups, all terminating in a common neutral-connection N, as follows:

Line A to 25, 26 to 27, 28 to 29, 30 to 31 and 32 to the neutral N.
Line B to 40, 39 to 38, 37 to 36, 35 to 34, and 33 to the neutral N.
Line C to 41, 42 to 43, 44 to 45, 46 to 47, and 48 to the neutral N.
Line A to 49, 50 to 51, 52 to 53, 54 to 55, and 56 to the neutral N.
Line B to 64, 63 to 62, 61 to 60, 59 to 58, and 57 to the neutral N.
Line C to 65, 66 to 67, 68 to 69, 70 to 71, and 72 to the neutral N.

It will be noted that corresponding diametrically opposite phase-groups are parallel-connected, such as the two phase-A groups 25–32 and 49–56.

The relative phases of the voltages which are generated in the different coils, at any instant, are shown by the various arrows of Figs. 3a and 3b, the arrows being numbered corresponding to the numbers of the coil-terminals. It will be noted that the phase-angle of the first phase-group, beginning at 25 and ending at 32, is exactly matched by the voltage of the diametrically disposed phase-group 49 to 56, with the successive intermediate voltages, of diametrically opposite points in these two phase-groups, disposed along circumscribed arcs which both extend to the top and left of the chord 25—32 or 49—56. In a conventional type of winding, these chords would be at diagrammatically opposite sides of the circumscribed circle, with one of the circumscribed arcs lying above and to the left of its chord, while the other arc lies below and to the right of its chord, so that, even though the terminal portions of the two chords were connected together, so that the chords are superposed over each other, the intermediate points would not lie superimposed over each other, and hence could not be connected.

In my invention, I utilize equalizer-connections for all of the equipotential intermediate points, or for as many of them as may be necessary, these equalizer-connections being shown at 27—51, 29—53, 31—55, 35—59, 37—61, 39—63, 43—67, 45—69, and 47—71.

In Fig. 1, the winding-procedure, for winding the armature or primary or stator-member of the motor, in the shop, consists in laying out the first winding-half, as a progressive winding, first laying the coil-sides which lie in the bottoms of the slots, starting with slot 1, for example, and then slot 2, and so on, around to slot 24. The top coil-sides are laid down as soon as possible. Thus, when the bottom coil-side is put in slot 11, the top coil-side is put in slot 1, and so on. The various terminal and neutral connections are then made, together with the coil-to-coil connections and the equalizer-connections as already described.

In Fig. 2, I show the same winding, which is laid out, in the shop, in a slightly different manner. In the winding shown in Fig. 2, the various coils of the second winding-half, instead of having their open ends at the front of the machine, as shown in Fig. 1, have their open ends in the back of the machine, as shown in Fig. 2.

Thus, in Fig. 1, the first coil of the second half of the winding, was the diamond-shaped coil having a coil-side in the bottom of slot 23, and a coil-side in the top of slot 13, this coil being opened at the front end, to provide the coil-terminals 49 and 50. In Fig. 2, the first coil of the second half of the winding is, in effect, the same coil, having a coil-side in the bottom of slot 23 and a coil-side in the top of slot 13, but, in this case, this diamond-shaped coil is opened at the rear of the machine, to provide the coil-terminals 49 and 50. The current still flows in the same directions in the two coil-sides, comparing the current-directions in Figs. 1 and 2, the only difference being that, in Fig. 1, the current flows first in one coil-side, while, in Fig. 2, the current flows first in the other coil-side. Thus, if the current is regarded as entering the winding from the Line A, flowing into the coil-terminal 49, the coil-current in Fig. 1 flows first upwardly through the bottom coil-side 23, and then downwardly through the top coil-side 13, whereas, in Fig. 2, the current flows first downwardly through the top coil-side 13 and then upwardly through the bottom coil-side 23.

The electrical effects of the windings in Figs. 1 and 2 are thus identical, and the electrical connections are the same. The winding of Fig. 2 has the disadvantage of requiring longer connections, which have to go around the outside of the core of the armature, to join various coil-terminals, some of which are located in the front of the machine and some of which are in the rear.

It will be noted that the effect of the use of two progressive windings, for the two halves of the windings, with the coil-ends at opposite ends of the machine, as shown in Fig. 2, with the particular order of coil-to-coil connections 50—51, 52—53, and so on, produces the electrical effect of a retrogressive winding, for the winding-half having the rearwardly disposed coil-terminals, so that the windings of the second pole of both Fig. 1 and Fig. 2 may be referred to as electrically retrogressing, the retrogressive effect being produced, in Fig. 1, by actually progressing backwardly, as the winding-half is traced around the semicircle of the circumference, while, in Fig. 2, the retrogressive effect is obtained by going around to the other side, and laying the winding progressively, as viewed from the other side, but retrogressively as viewed from the first side.

Fig. 4 is a diagrammatic representation of a complete motor, having a primary winding as described, with the terminal-leads A, B and C and the neutral-connection N, said motor also having a squirrel-cage secondary member 75, which is shown as the rotor-member of the machine.

From the foregoing description, it will thus be apparent that, at a very small extra winding-expense, I have been able to produce a two-pole winding in which the diametrically opposite points have precisely identical potentials, so that equalizer-connections can be utilized, thus assisting in solving the long-standing problem of vibration and noise, which has periodically plagued the manufacturers and users of two-pole polyphase induction-motors, as long as such motors have been built.

I claim as my invention:

1. A two-pole polyphase dynamo-electric machine having an armature member having the windings of one pole wound electrically progressively and the windings of the other pole wound electrically retrogressively, each of the two windings comprising a plurality of serially connected phase-groups, corresponding phase-groups of the two windings being parallel-connected, and equalizer connections at a plurality of intermediate points.

2. A two-pole polyphase dynamo-electric machine having an armature member having the open ends of the coils of the windings of one pole disposed at one end of the machine, and having the open ends of the windings of the other pole disposed at the other end of the machine, each of the two windings comprising a plurality of serially connected phase-groups, corresponding phase-groups of the two windings being parallel-connected, and equalizer connections at a plurality of intermediate points.

3. A two-pole polyphase induction machine having a primary member and a secondary member, characterized by the primary member having the windings of one pole wound electrically progressively and the windings of the other pole wound electrically retrogressively, each of the two windings comprising a plurality of serially connected phase-groups, corresponding phase-groups of the two windings being parallel-connected, and equalizer connections at a plurality of intermediate points.

4. A two-pole polyphase induction machine having a primary member and a secondary member, characterized by the primary member having the open ends of the coils of the windings of one pole disposed at one end of the machine, and having the open ends of the windings of the other pole disposed at the other end of the machine, each of the two windings comprising a plurality of serially connected phase-groups, corresponding phase-groups of the two windings being parallel-connected, and equalizer connections at a plurality of intermediate points.

MYRON S. HANCOCK.

REFERENCES CITED

The following references are of record in the file of this patent:

UNITED STATES PATENTS

| Number | Name | Date |
| --- | --- | --- |
| 1,447,164 | Hague | Feb. 27, 1923 |
| 1,552,385 | MacMillan | Sept. 1, 1925 |
| 2,408,219 | Liwschitz | Sept. 24, 1946 |
| 2,414,571 | Veinott | Jan. 21, 1947 |